United States Patent
Akahori

(10) Patent No.: US 8,345,799 B2
(45) Date of Patent: Jan. 1, 2013

(54) CHANNEL ESTIMATING METHOD AND CHANNEL ESTIMATOR

(75) Inventor: Hiroji Akahori, Tokyo (JP)

(73) Assignee: Oki Semiconductor Co., Ltd., Tokyo (JP)

(*) Notice: Subject to any disclaimer, the term of this patent is extended or adjusted under 35 U.S.C. 154(b) by 716 days.

(21) Appl. No.: 12/507,822

(22) Filed: Jul. 23, 2009

(65) Prior Publication Data

US 2010/0027720 A1    Feb. 4, 2010

(30) Foreign Application Priority Data

Jul. 30, 2008    (JP) .................. 2008-195836

(51) Int. Cl.
*H03K 9/00*    (2006.01)
(52) U.S. Cl. ........ 375/316; 375/139; 375/260; 375/142; 375/219; 375/347; 370/210
(58) Field of Classification Search .............. 375/316, 375/139, 260, 142, 219, 347; 370/210
See application file for complete search history.

(56) References Cited

U.S. PATENT DOCUMENTS

| 2004/0091057 | A1* | 5/2004 | Yoshida .................... 375/260 |
| 2008/0239941 | A1* | 10/2008 | Gold-Gavriely et al. ..... 370/210 |
| 2008/0304583 | A1* | 12/2008 | Miyoshi et al. .............. 375/260 |

FOREIGN PATENT DOCUMENTS

JP    2000115087 A    4/2000

* cited by examiner

*Primary Examiner* — Zewdu Kassa
(74) *Attorney, Agent, or Firm* — Volentine & Whitt, PLLC

(57) ABSTRACT

There is provided a channel estimating method of performing frequency conversion by a first fast Fourier transformation on a reception signal and extracting a desired signal after demodulating the reception signal, and deriving electrical energy against time delay of a channel by inverse fast Fourier transformation of the extracted result, wherein: values of a low pass filter, having an output from oversampling the input to the first fast Fourier transformation, are thinned by a plurality of thinning circuits with the same synchronization and different discrete times, and based on the outputs of the plurality of thinning circuits, the electrical energy against time delay related to the reception signal arrival time position is derived by respectively performing the first fast Fourier transformation and the inverse fast Fourier transformation.

13 Claims, 4 Drawing Sheets

CHANNEL ESTIMATING METHOD AND CHANNEL ESTIMATOR

CROSS-REFERENCE TO RELATED APPLICATION

This application claims priority under 35 USC 119 from Japanese Patent Application No. 2008-195836 filed on Jul. 30, 2008, the disclosure of which is incorporated by reference herein.

BACKGROUND

1. Technical Field

The present invention relates to a channel estimating method in a receiver device using Orthogonal Frequency-Division Multiplexing (referred to as "OFDM") or similar Fast Fourier Transformation (referred to as "FFT" below) for demodulating, and to a channel estimator of the same. The present invention is technology applicable, for example, to an equalizer for full-seg Integrated Services Digital Broadcasting-Terrestrial (referred to below as ISDB-T), to an equalizer in OFDM, and the like.

2. Related Art

Up to now, for example as described in Japanese Patent Application Laid-Open (JP-A) No. 2000-115087, a channel estimator for deriving a delay profile of an OFDM signal (electrical energy against time delay, referred to below simply as "electrical energy") derives the electrical energy, by: receiving a OFDM signal; demodulating by performing frequency conversion using fast Fourier transformation; then extracting a desired signal (called a Scattered Pilot signal in ISDB-T, referred to below as a "pilot signal"); and performing inverse fast Fourier transformation (referred to below as "IFFT").

However, in channel estimators up to now, a noise component superimposed on the reception signal is included in the electrical energy, and not only is the noise component superimposed on the electrical energy present in the channel, but with the channel in time delays in which the electrical energy is extremely small, or maybe not present, electrical energy becomes evident due to the noise, and correct channel estimating results are not obtainable. If equalization processing is performed based on such incorrect channel estimating information and OFDM demodulating carried out, since equalization processing is performed with electrical energy infiltrated with noise this leads to the problem that the reception characteristics are impaired.

Recently in demodulators using non-OFDM signal FFT, of a single carrier having a guard interval (referred to below as "GI") provided to prevent intersymbol interference due to multi-path delay, and other such devices, similar problems to the above also occur.

SUMMARY

The present invention provides a method for performing channel estimating that has improved reception characteristics with reduced influence from any noise component, and a estimator of the same.

According to an aspect of the present invention, there is provided a channel estimating method of performing frequency conversion by a first fast Fourier transformation on a reception signal and extracting a desired signal after demodulating the reception signal, and deriving electrical energy against time delay of a channel by inverse fast Fourier transformation of the extracted result, wherein:

values of a low pass filter, having an output from oversampling the input to the first fast Fourier transformation, are thinned by a plurality of thinning circuits with the same synchronization and different discrete times, and based on the outputs of the plurality of thinning circuits, the electrical energy against time delay related to the reception signal arrival time position is derived by respectively performing the first fast Fourier transformation and the inverse fast Fourier transformation.

According to another aspect of the present invention, there is provided a channel estimator that performs frequency conversion on a reception signal by a plurality of first fast Fourier transformation circuits and, after respectively demodulating the reception signal, respectively extracts a desired signal using a plurality of extraction circuits, and derives electrical energy against time delay of a channel by processing the extracted results in a plurality of inverse fast Fourier transformation circuits, the channel estimator including:

a low pass filter that performs oversampling on the inputs of the plurality of first fast Fourier transformation circuits and only allows a desired frequency band to pass through;

a plurality of timing circuits that thin the output of the low pass filter with the same synchronization and different discrete times, wherein the channel estimator derives the electrical energy against time delay related to the reception signal arrival time position using each of the first fast Fourier transformation circuits and each of the inverse fast Fourier transformation circuits based on the outputs of the plurality of thinning circuits.

According to the present invention, the values of a low pass filter (referred to below as "LPF") having an output from oversampling the input to the first fast Fourier transformation, are thinned by plural thinning circuits with the same synchronization and different discrete times, and based on the outputs of the plural thinning circuits, and the electrical energy against time delay related to the reception signal arrival time position is derived by respectively performing the first FFT and the IFFT. Therefore the influence of noise etc. can be reduced, and the reception characteristics when there is superimposed noise can be improved.

BRIEF DESCRIPTION OF THE DRAWINGS

Exemplary embodiments of the present invention will be described in detail based on the following figures, wherein.

DETAILED DESCRIPTION

Explanation will be given below of a mode for implementing the present invention. The mode for implementing the present invention will be clear from explanation of the preferably exemplary embodiments explained below, with reference to the drawings attached. However, the drawings are for ease of explanation, and do not limit the scope of the present invention.

First Exemplary Embodiment

Figure 1:
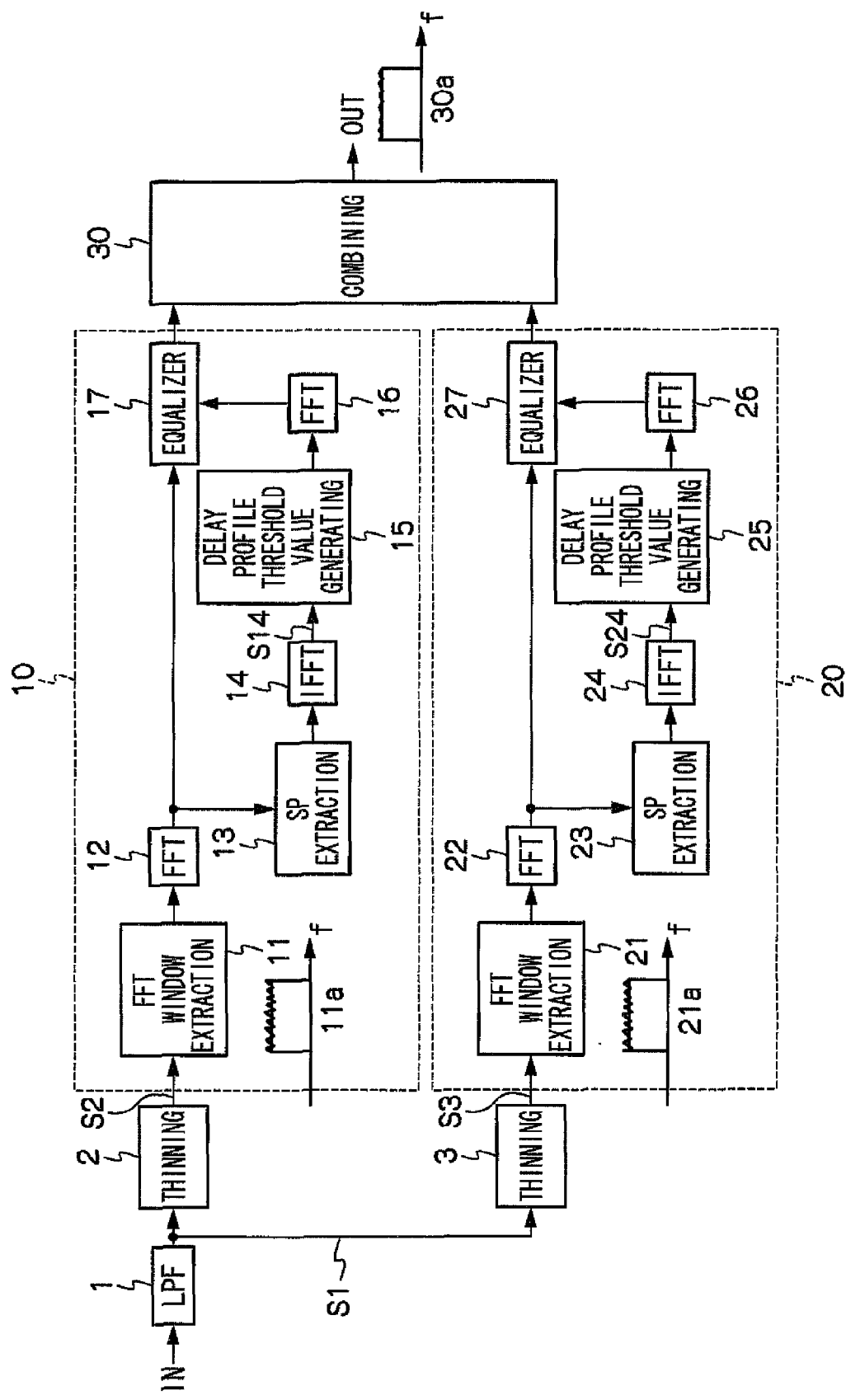
FIG. 1 is a schematic configuration diagram showing a channel estimator according to a first exemplary embodiment of the present invention.

FIG. 1 is a schematic configuration diagram showing a channel estimator according to a first exemplary embodiment of the present invention.

The channel estimator is, for example, provided to an OFDM receiver having an LPF1 for sampling an OFDM signal IN, this being an OFDM modulated received signal, at a frequency f. The output side of the LPF1 is connected via plural (for example two) thinning circuits 2, 3 to two arithmetic circuits 10, 20 for driving electrical energy. The two arithmetic circuits 10, 20 are circuits configured substantially the same as each other.

The first arithmetic circuit 10 is configured with an FFT window extraction circuit 11, a first FFT circuit 12, an extraction circuit (for example a pilot signal extraction circuit) 13, an IFFT circuit 14, a threshold value generation circuit (for example a delay profile threshold value generating circuit) 15, a second FFT circuit 16, and an equalizer 17. In the same manner, the second arithmetic circuit 20 is also configured with an FFT window extraction circuit 21, a first FFT circuit 22, a pilot signal extraction circuit 23, an IFFT circuit 24, a delay profile threshold value generating circuit 25, a second FFT circuit 26, and an equalizer 27. The arithmetic circuits 10, 20 are connected to a combining circuit 30.

The LPF1 is a circuit that performs oversampling on the input of the FFT window extraction circuits 11, 21, and only allows the desired frequency band(s) to pass. Of the two thinning circuits 2, 3 connected to the output side of the LPF1, the thinning circuit 2 is a circuit that periodically thins an output signal S1 of the LPF1 so as to give an output cycle corresponding to the input of the FFT window extraction circuit 11. The thinning circuit 3 is a circuit that thins the output signal S1 of the LPF1 so as to have the same synchronization as the thinning circuit 2 and to have different discrete times. The FFT window extraction circuits 11, 21 in the respective arithmetic circuits 10, 20 are connected to the output sides of the thinning circuits 2, 3.

The FFT window extraction circuit 11 in the arithmetic circuit 10 extracts the values for the sampling number required for FFT processing and passes these to the FFT circuit 12. The FFT circuit 12 is a circuit that performs FFT processing on the OFDM modulated signal supplied by the FFT window extraction circuit 11. The pilot signal extraction circuit 13 and the equalizer 17 are connected to the output side of the FFT circuit 12. The pilot signal extraction circuit 13 is a circuit that extracts only a pilot signal SP, which is a known signal, from the output signal of the FFT circuit 12. The IFFT circuit 14 is connected to the output side of the pilot signal extraction circuit 13. The IFFT circuit 14 is a circuit that performs IFFT processing using the pilot signal SP extracted by the pilot signal extraction circuit 13. The delay profile threshold value generating circuit 15 is connected to the output side of the IFFT circuit 14.

The delay profile threshold value generating circuit 15 is a circuit that generates a threshold value based on the maximum value, or on the integrated value, of the electrical energy from a signal S14 of channel information that is the electrical energy against time delay by IFFT processing of the IFFT circuit 14, and performs processing such that values of the threshold value or above are unchanged and values lower than the threshold value are discarded (replaced by zero). The FFT circuit 16 is connected to the output side of the delay profile threshold value generating circuit 15. The FFT circuit 16 is a circuit that derives the transfer function of the frequency region generated in the channel by FFT, based on the electrical energy against time delay supplied by the delay profile threshold value generating circuit 15. The equalizer 17 is connected to the output side of the FFT circuit 16. The equalizer 17 is a circuit that multiplies the output signal of the FFT circuit 12 by the complex conjugate supplied by the FFT circuit 16, removes the transfer function component generated in the channel and converts into a signal that can be OFDM demodulated. The combining circuit 30 is connected to the output side of the equalizer 17.

The FFT window extraction circuit 21 in the arithmetic circuit 20 extracts the values for the sampling number required for FFT processing and passes these to the FFT circuit 22. The FFT window extraction circuit 21 only differs from the FFT window extraction circuit 11 in that the input signal is different, since an output signal S3 of the thinning circuit 3 is different from the output signal S2 of the thinning circuit 2. The FFT circuit 22 is a circuit that performs FFT processing on the signal supplied from the FFT window extraction circuit 21. The pilot signal extraction circuit 23 and the equalizer 27 are connected to the output side of the FFT circuit 22. The pilot signal extraction circuit 23 is a circuit that extracts only a pilot signal SP from the output signal of the FFT circuit 22. The IFFT circuit 24 is connected to the output side of the pilot signal extraction circuit 23. The IFFT circuit 24 is a circuit that performs IFFT processing with the pilot signal SP extracted by the pilot signal extraction circuit 23. The delay profile threshold value generating circuit 25 is connected to the output side of the IFFT circuit 24.

The delay profile threshold value generating circuit 25 is a circuit that generates a threshold value based on the maximum value, or on the integrated value, of the electrical energy from a signal S24 of channel information that is the electrical energy against time delay by IFFT processing of the IFFT circuit 24, and performs processing such that values of the threshold value or above are unchanged and values lower than the threshold value are discarded (replaced by zero). The FFT circuit 26 is connected to the output side of the delay profile threshold value generating circuit 25. The FFT circuit 26 is a circuit that derives the transfer function of the frequency region generated in the channel by FFT, based on the electrical energy against time delay supplied by the delay profile threshold value generating circuit 25. The equalizer 27 is connected to the output side of the FFT circuit 26. The equalizer 27 is a circuit that multiplies output signal of the FFT circuit 22 with the complex conjugate supplied by the FFT circuit 26, removes the transfer function component generated by the channel and converts into a signal that can be OFDM demodulated. The combining circuit 30 is connected to the output side of the equalizer 27.

The combining circuit 30 is a circuit that combines the results of equalizing processing of the equalizers 17, 27 and outputs an OUT signal capable of OFDM demodulation.

Channel Estimating Method of the First Exemplary Embodiment

Figure 2:
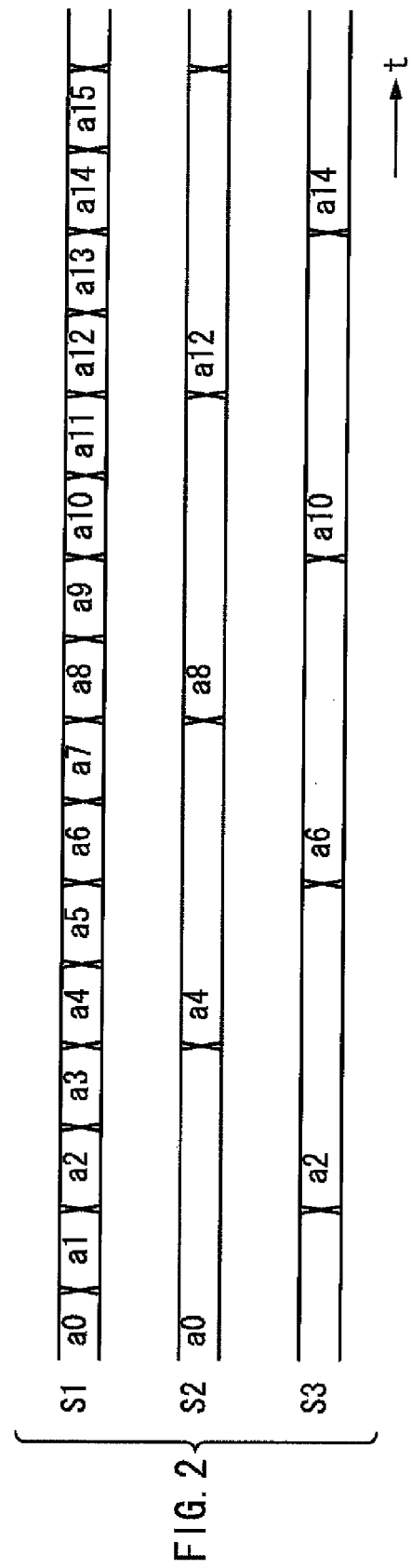
FIG. 2 is a schematic diagram showing a state of input and output signals to and from the thinning circuits 2, 3 of FIG. 1.
Figure 3:
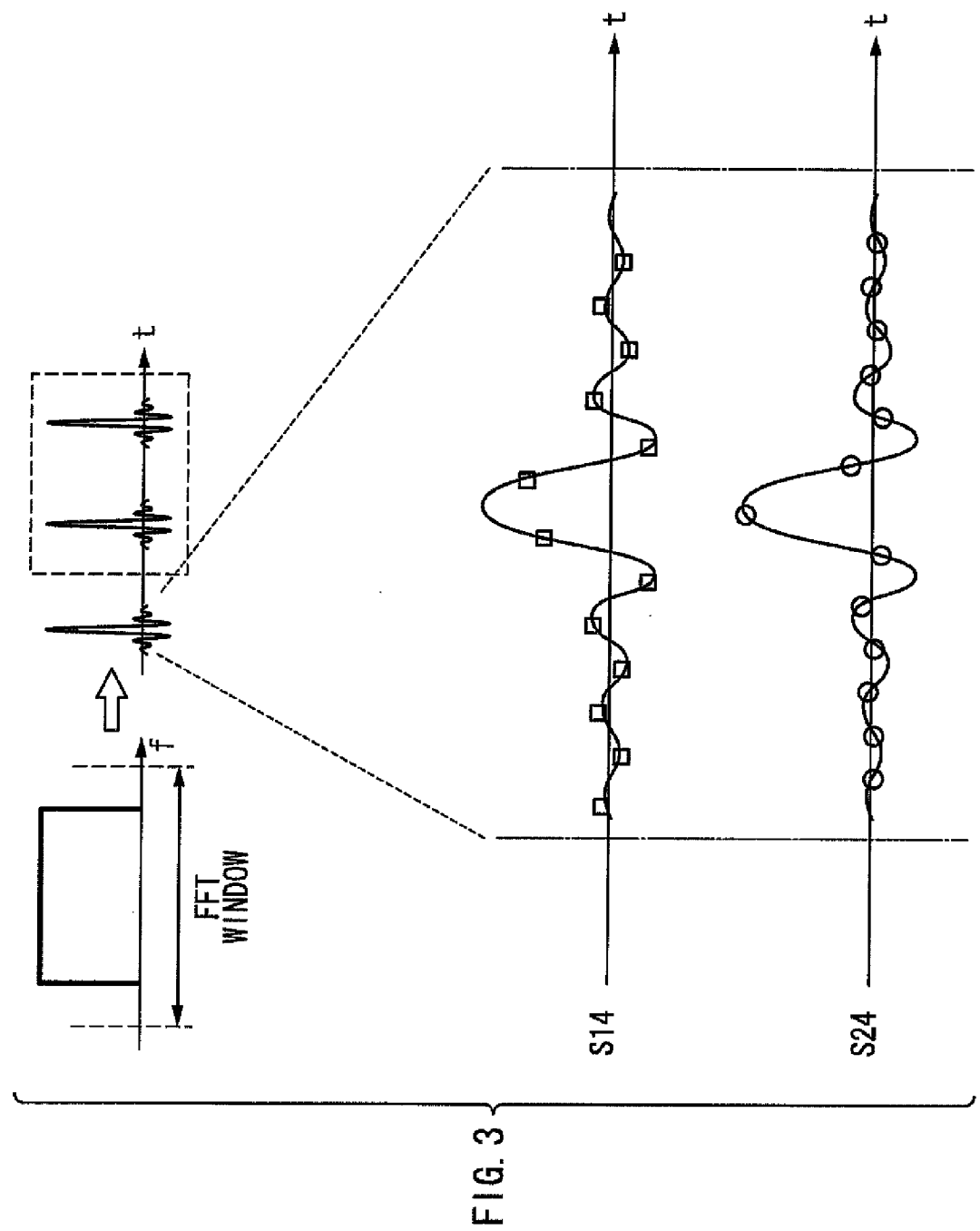
FIG. 3 is a waveform diagram showing output signals from the IFFT circuits 14, 24.

FIG. 2 is a schematic diagram showing states of input and output signals into and out of the thinning circuits 2, 3 of FIG. 1. The horizontal axis in FIG. 2 is time t, and sampling values a0, a1, ..., a15, ... of the FDM signal IN, which is the output signal S1 of the LPF1, are shown. FIG. 3 is a waveform diagram showing the output signal from the IFFT circuits 14, 24 of FIG. 1. The horizontal axis in FIG. 3 is time t, the discrete time result of the electrical energy are shown with square marks on the curve of the output signal S14 of the IFFT circuit 14, and the discrete time result of the electrical energy are shown with circular marks on the curve of the output signal S24 of the IFFT circuit 24.

In the channel estimating method of the first exemplary embodiment, in the plural (for example 2) arithmetic circuits 10, 20 that perform the same arithmetic processing, the influence of noise etc. is reduced by changing the discrete time positions of the output signals 2, 3 supplied from the thinning circuits 2, 3, and respectively combining these in the combining circuit 30. The operation thereof is explained below.

When the OFDM signal IN, which is the reception signal, is input to the LPF1, in the LPF1 only the desired frequency band is output by oversampling, and the sampling values a0, a1, . . . , a15 . . . , which are this output signal S1, are sent to the two thinning circuits 2, 3. The thinning circuits 2, 3 perform thinning processing so as to obtain two sets of values from the sampling values a0, a1, . . . , a15 . . . , with the same synchronization and different discrete time positions. Namely, in the thinning circuit 2 the output signal S1 of the LPF1 is periodically thinned so as to have an output cycle corresponding to the input of the FFT window extraction circuit 11 of a later stage, and the output signal S2 of sampling values a0, a4, a8, a12, . . . is sent to the FFT window extraction circuit 11 in the one arithmetic circuit 10. In the thinning circuit 3 the output signal S1 of the LPF1 is periodically thinned so as to have an output cycle corresponding to the input of the FFT window extraction circuit 21 of a later stage, and the output signal S3 of sampling values a2, a6, a10, a14, . . . , having the same synchronization but different discrete times, is sent to the FFT window extraction circuit 21 in the other arithmetic circuit 20.

In the arithmetic circuit 10, the FFT window extraction circuit 11 extracts the FFT window 11a from the output signal S2, and passes the values of the sampling number required for FFT processing at a later stage to the FFT circuit 12. The FFT circuit 12 performs frequency conversion by FFT processing on the output signal of the FFT window extraction circuit 11, demodulates the reception signal, and sends this output signal to the pilot signal extraction circuit 13 and the equalizer 17. The pilot signal extraction circuit 13 extracts only a pilot signal SP, which is a known signal, from the output signal of the FFT circuit 12, sending the pilot signal SP to the IFFT circuit 14. The IFFT circuit 14 performs IFFT processing to the received pilot signal SP and, as shown by the squares on the curve in FIG. 3, derives channel information, which is the discrete time results of the electrical energy, and sends this output signal S14 to the delay profile threshold value generating circuit 15.

Since, when noise is superimposed, the discrete time results of the above electrical energy have a noise component added therein, a threshold value is generated in the delay profile threshold value generating circuit 15, based on the maximum value, or on the integrated value, of the electrical energy, and processing is performed such that values of the threshold value or above are unchanged and values lower than the threshold value are discarded (replaced by zero), reducing the influence of noise, and the processing result is sent to the FFT circuit 16. The FFT circuit 16 performs FFT processing based on the electrical energy supplied from the delay profile threshold value generating circuit 15, converting into values equivalent to the transfer function of the frequency region generated by the channel, and supplies the conversion result to the equalizer 17. The equalizer 17 multiplies the output signal of the FFT circuit 12 by the complex conjugate in the conversion result of the FFT circuit 16, removing the transfer function component generated in the channel and converting into a signal that can be OFDM demodulated, and the output signal thereof is sent to the combining circuit 30.

In the arithmetic circuit 20 too, substantially the same arithmetical processing as performed as in the arithmetic circuit 10. Namely, the FFT window extraction circuit 21 extracts the FFT window 21a from the output signal S3 of the thinning circuit 3, and passes the values of the sampling number required for FFT processing at a later stage to the FFT circuit 22. The FFT circuit 22 performs frequency conversion by FFT processing on the output signal of the FFT window extraction circuit 21, demodulates the reception signal, and sends this output signal to the pilot signal extraction circuit 23 and the equalizer 27. The pilot signal extraction circuit 23 extracts only the pilot signal SP from the output signal of the FFT circuit 22, sending the pilot signal SP to the IFFT circuit 24. The IFFT circuit 24 performs IFFT processing to the received pilot signal SP and, as shown by the circles on the curve in FIG. 3, derives channel information, which is the discrete time results of the electrical energy, and sends this output signal S24 to the delay profile threshold value generating circuit 25.

Since, when noise is superimposed, the discrete time results of the above electrical energy have a noise component added therein, a threshold value is generated in the delay profile threshold value generating circuit 25, based on the maximum value, or on the integrated value, of the electrical energy, and processing is performed such that values of the threshold value or above are unchanged and values lower than the threshold value are discarded (replaced by zero), reducing the influence of noise, and the processing result is sent to the FFT circuit 26. The FFT circuit 26 performs FFT processing based on the electrical energy supplied from the delay profile threshold value generating circuit 25, converting into values equivalent to the transfer function of the frequency region generated by the channel, and supplies the conversion result to the equalizer 27. The equalizer 27 multiplies the output signal of the FFT circuit 22 by the complex conjugate in this conversion result, removing the transfer function component generated in the channel and converting into a signal that can be OFDM demodulated, and the output signal thereof is sent to the combining circuit 30.

If equalization processing is performed using one or other of the processing results of the delay profile threshold value generating circuit 15 or the delay profile threshold value generating circuit 25, the error of the transfer function in the frequency region generated by the channel is smaller due to reducing noise, however, since extremely small values of electrical energy that ordinarily should be obtained are also discarded, although the error is smaller due to equalization processing it is not completely removed. In order to address this, in the first exemplary embodiment the equalization processing is executed respectively on the processing results of both the delay profile threshold value generating circuit 15 and the delay profile threshold value generating circuit 25, and the result thereof combined in the combining circuit 30. Therefore, as shown in the FTT window 30a of the output signal OUT in FIG. 1, mutually generated error is suppressed, and even more correct equalization processing becomes possible.

Effect of the First Exemplary Embodiment

According to the first exemplary embodiment there are effects like the following (a), (b).

(a) In the two arithmetic circuits 10, 20 performing the same arithmetical processing, the discrete time positions of the output signals S2, S3 supplied from the thinning circuits 2, 3 are changed, and the respective results thereof are combined in the combining circuit 30, hence the influence of noise can be reduced. Consequently the reception characteristics when noise is superimposed can be improved.

(b) Explanation will be given of the effect of (a) in comparison to conventional technology. In conventional technology, for example, a circuit equivalent to that of the delay profile threshold value generating circuit 15 in the arithmetic circuit 10 of FIG. 1 is provided, and using this circuit, the electrical energy is compared to threshold values and values of the threshold value or lower are discarded. This has the merit of reducing the noise component, however there is the demerit that the error in the channel estimating result (replica) increases. In order to eliminate this demerit, in the first exemplary embodiment, after discarding of the threshold value or lower in the delay profile threshold value generating circuits 15, 25 has been executed in a similar manner to up to now, equalization processing is performed in the two equalizers 17, 27, and the results after equalization processing are combined in the combining circuit 30. Consequently, it becomes possible to suppress error due to the averaging effect of the combining, and the reduction in noise component effect is still obtained.

Second Exemplary Embodiment

Figure 4:
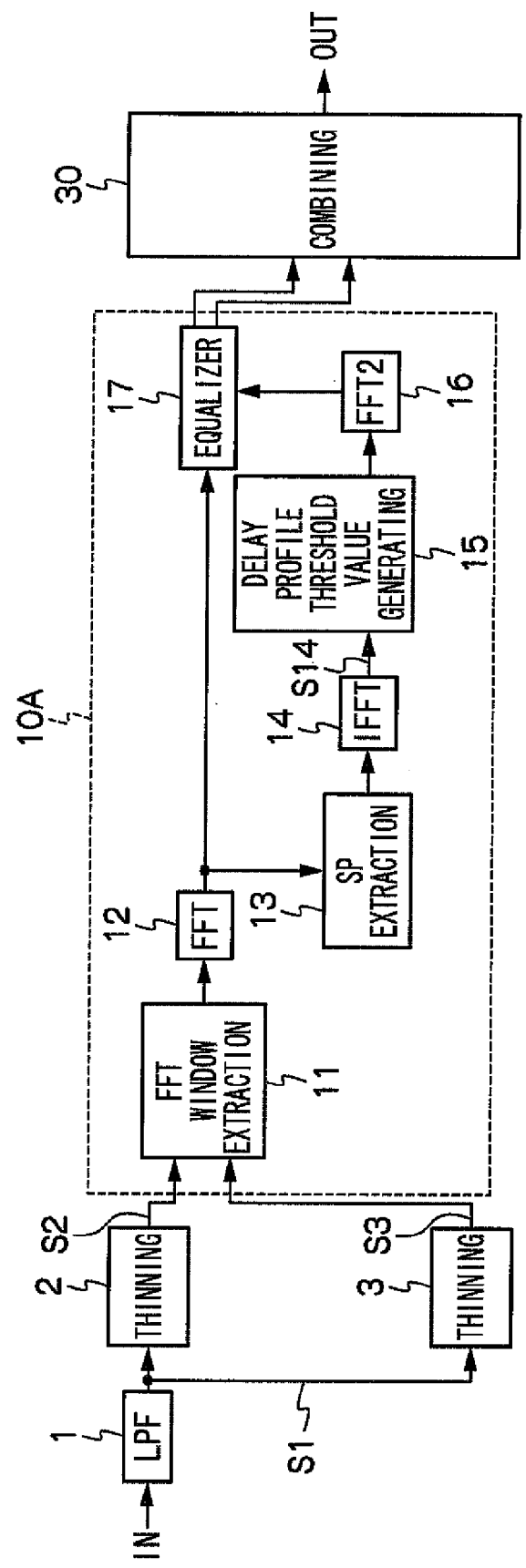
FIG. 4 is a schematic configuration diagram showing a channel estimator according to a second exemplary embodiment of the present invention.

FIG. 4 is a schematic configuration diagram showing a channel estimator in a second exemplary embodiment of the present invention, common elements to the elements of the first exemplary embodiment shown in FIG. 1 are allocated the same reference numerals.

In the channel estimator of the second exemplary embodiment, a single common arithmetic circuit 10A is provided in place of the two arithmetic circuits 10, 20 of substantially the same circuit configuration. The arithmetic circuit 10A is of a similar circuit configuration to that of the arithmetic circuit 10, and the arithmetic circuit 10A uses time allocation and executes channel estimating processing.

Therefore, substantially the same operational effects as that of the first exemplary embodiment can be exhibited, and since the arithmetic circuit 20 is omitted the circuit configuration can be simplified.

MODIFIED EXAMPLE

The present invention is not limited to the above exemplary embodiments, and various modes of use and modifications are possible. Examples of such modes of use and modifications include, for example, those such as the following (1) to (3).

(1) In the first exemplary embodiment, the two thinning circuits 2, 3 and the two arithmetic circuits 10, 20 were provided, however three or more sets thereof may be provided. By doing so the error suppressing effect from the averaging effect of combining can be even further improved.

(2) The maximum value or the integrated value used in generating the threshold value in the delay profile threshold value generating circuits 15, 25 of FIG. 1 reference the electrical energy of different discrete times, and so separate respective threshold values are generated. However, configuration may be changed so as to provide a single common delay profile threshold value generating circuit 15 or delay profile threshold value generating circuit 25, and two threshold values may be generated from a single maximum value or integrated value. The circuit configuration can thereby be simplified.

(3) Explanation has been given in the first exemplary embodiment and the second exemplary embodiment of channel estimators that have been used as OFDM signal demodulators, however the present invention is applicable to demodulators using non-OFDM FFT of a single carrier or the like having GI, and other such devices.

What is claimed is:

1. A channel estimating method of performing frequency conversion by a first fast Fourier transformation on a reception signal and extracting a desired signal after demodulating the reception signal, and deriving electrical energy against time delay of a channel by inverse fast Fourier transformation of the extracted result, wherein:
    values output by a low pass filter that is configured to oversample the reception signal are thinned by a plurality of thinning circuits with the same synchronization and different discrete times, and based on the outputs of the plurality of thinning circuits, the electrical energy against time delay related to the reception signal arrival time position is derived by respectively performing the first fast Fourier transformation and the inverse fast Fourier transformation,
    wherein, based on the electrical energy, a threshold value is generated from a maximum value or an integrated value of the electrical energy, and threshold processing is performed to leave unchanged values of the electrical energy equal to or greater than the threshold value and to discard values of the electrical energy lower than the threshold value.

2. The channel estimating method of claim 1, wherein for the electrical energy of different discrete times:
    separate threshold values are generated based on the maximum value or the integrated value; or
    a common threshold value is generated based on the maximum value or the integrated value.

3. The channel estimating method of claim 1 further comprising:
    performing processing of a second fast Fourier transformation on the electrical energy against time delay related to the reception signal arrival time position after the threshold processing, converting the electrical energy into values equivalent to a transfer function of the channel; and
    performing equalization processing on the result of the first fast Fourier transformation responsive to the converting.

4. The channel estimating method of claim 3, further comprising combining the results of the equalization processing.

5. The channel estimating method of claim 1, wherein the desired signal is a pilot signal.

6. A channel estimator that performs frequency conversion on a reception signal by a plurality of first fast Fourier transformation circuits and, after respectively demodulating the reception signal, respectively extracts a desired signal using a plurality of extraction circuits, and derives electrical energy against time delay of a channel by processing the extracted results in a plurality of inverse fast Fourier transformation circuits, the channel estimator comprising:
    a low pass filter that performs oversampling on the reception signal and only allows a desired frequency band to pass through;
    a plurality of thinning circuits that thin the output of the low pass filter with the same synchronization and different discrete times, wherein the channel estimator derives the electrical energy against time delay related to the reception signal arrival time position using each of the first fast Fourier transformation circuits and each of the inverse fast Fourier transformation circuits based on the outputs of the plurality of thinning circuits; and
    a plurality of threshold value generation circuits that based on the electrical energy, generate respective threshold values from a maximum value or an integrated value of the electrical energy, and perform processing that leaves values of the electrical energy equal to or greater than the threshold value unchanged and discards values of the electrical energy lower than the threshold value.

7. The channel estimator of claim 6, further comprising:
a plurality of second fast Fourier transformation circuits that respectively perform fast Fourier transformation processing on the output of each of the respective threshold value generation circuits, and convert the electrical energy into values equivalent to the transfer function of the channel; and
a plurality of equalizers that perform equalization processing on the respective outputs of each of the respective first fast Fourier transformation circuits based on the output of each of the second fast Fourier transformation circuits.

8. The channel estimator of claim 7, further comprising a combining circuit that combines the outputs of the plurality of equalizers.

9. The channel estimator of claim 8, wherein the plurality of first fast Fourier transformation circuits, the plurality of extraction circuits, the plurality of inverse fast Fourier transformation circuits, the plurality of threshold value generation circuits, the plurality of second fast Fourier transformation circuits and the plurality of equalizers are configured using time allocation from a common first fast Fourier transformation circuit, a common extraction circuit, a common inverse fast Fourier transformation circuit, a common threshold value generation circuit, a common second fast Fourier transformation circuit and a common equalizer.

10. The channel estimator of claim 6, wherein the desired signal is a pilot signal.

11. A channel estimator comprising:
a low pass filter configured to oversample a reception signal;
a plurality of thinning circuits configured to thin an output of the low pass filter with a same synchronization and at different discrete times to provide respective thinned outputs;
a plurality of processing circuits each configured to frequency convert respective thinned outputs of the thinning circuits using a fast Fourier transformation, extract a desired signal responsive to a result of the fast Fourier transformation, derive electrical energy against time delay of a channel from the desired signal using an inverse fast Fourier transformation, and equalize an output of the fast Fourier transformation responsive to a result of the inverse fast Fourier transformation to provide an equalized signal;
a combiner that combines the equalized signals from the plurality of processing circuits to provide an output of the channel estimator; and
a plurality of threshold value generation circuits that
based on the electrical energy, generate respective threshold values from a maximum value or an integrated value of the electrical energy, and
perform processing that leaves values of the electrical energy equal to or greater than the threshold value unchanged and discards values of the electrical energy lower than the threshold value.

12. The channel estimator of claim 11, wherein the reception signal is an orthogonal frequency division multiplexed (OFDM) signal.

13. The channel estimator of claim 12, wherein the desired signal is a pilot signal.

* * * * *